May 29, 1962 I. S. SAVERSLAK 3,036,922
PROCESS OF PREPARING A BONELESS COOKED POULTRY PRODUCT
Filed Jan. 8, 1960 2 Sheets-Sheet 1
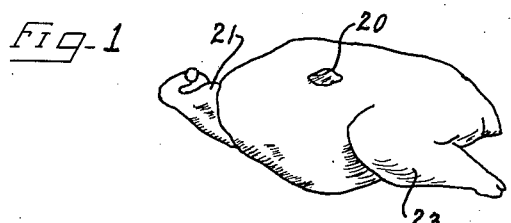
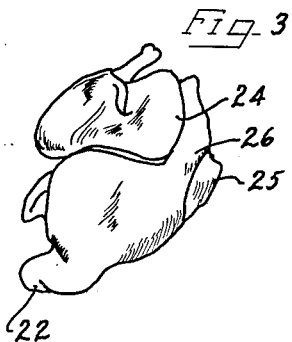
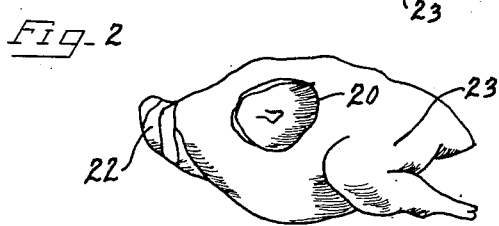
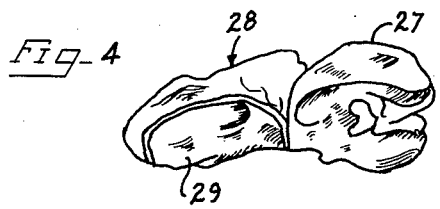
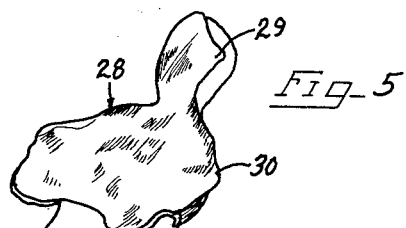
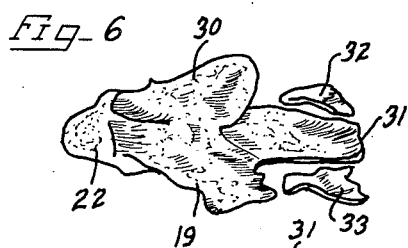
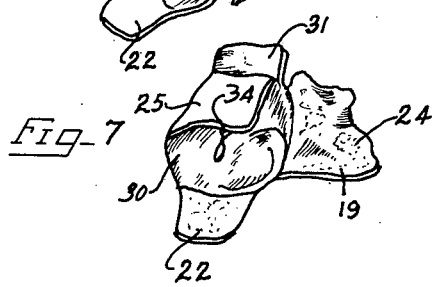
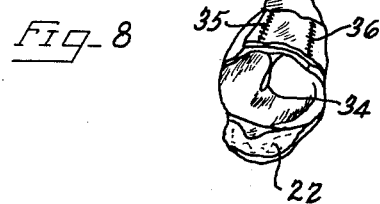
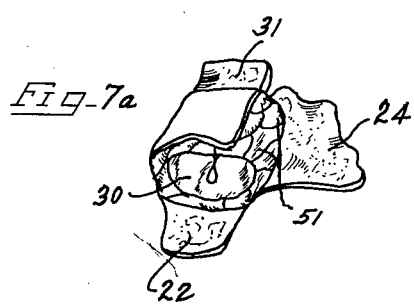
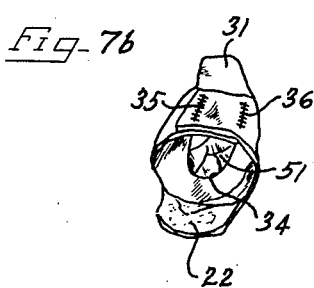
Inventor
Irving S. Saverslak
by Hill, Sherman, Meroni, Gross & Simpson Attys.

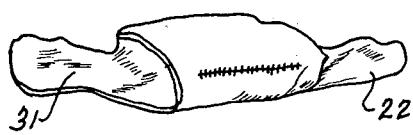
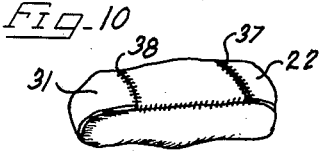
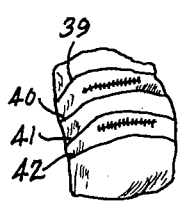
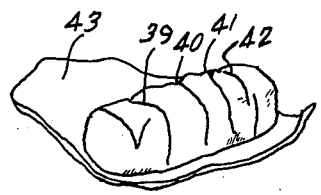
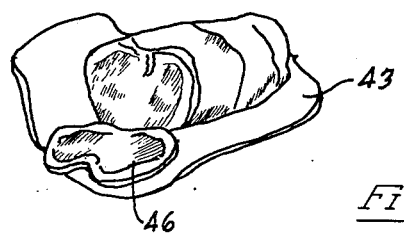
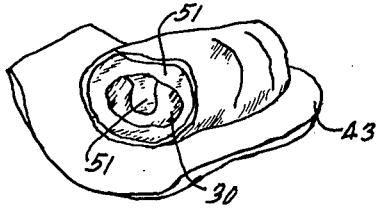
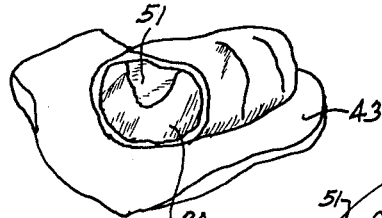
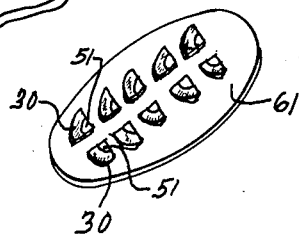

United States Patent Office 3,036,922
Patented May 29, 1962

3,036,922
PROCESS OF PREPARING A BONELESS COOKED POULTRY PRODUCT
Irving S. Saverslak, 3153 University, Highland Park, Ill.
Filed Jan. 8, 1960, Ser. No. 1,325
10 Claims. (Cl. 99—107)

The present invention relates to cooked products, and more particularly to cooked fowl and poultry products and to methods for their preparation.

Consumer demand has been increasing progressively over the last few years for boneless fowl and poultry products, both domestic and wild, such as pressed duck, turkey, chicken and the like.

Such products have been known to be prepared by compressing poultry pieces and fragments into a mass and thereafter cooking the same.

However, attempts prior to my invention to provide pieces and fragments of poultry in a compact coherent mass after cooking have failed to fulfill the purposes for which intended. The cooked fowl or poultry mass would disintegrate and separate into pieces and fragments under the slicing knife.

In my copending application Serial No. 751,935, filed July 30, 1958, now Patent No. 2,922,718, of which the present application is a continuation-in-part, I disclose one form of overcoming this difficulty by employment of a method of preparing a cooked poultry product wherein the product comprises substantially all white breast meat encased in the fowl skin which is readily sliceable.

It will be further appreciated that, if in addition to providing a cooked fowl product that is readily sliceable, variations in the meats used could be produced, for example, by combining a coherent mass of white meat with dark meat in definite patterns or schemes, gastronomical advantages and delights would be obtained, pleasing to both the appetite and the eye.

I have discovered that the solution to the problem lies in the realization that an edible and compatible adhesive is required for binding and maintaining the pieces and fragments together in a unified mass, which forms, in this respect, an improvement over the invention of my copending application.

Gel substances heretofore used for binding meat products, such as boneless hams, all suffer from common deficiencies—a jelly-like consistency and poor adhesive qualities.

Needless to say, the impression presented to the eye of a gourmet—profession or amateur—by the presence of such gels in a cooked meat product has a deleterious effect on the appetite.

Furthermore, the gels used in meat products have comparatively neutral tastes which, it can be appreciated, is an unexpected and desired experience for a palate rendered sensitive to a savory meat flavor.

Moreover, my experience also indicates that a compressed mass of cooked meat secured, to a limited extent, by these gels, is subject to fragmentation along the binding boundaries due to the composition of the gels and deterioration in the limited binding force of the gel over time. For example, the gels used to bond boneless hams, when subjected to the ambient temperature of the kitchen for a relatively short time, have been known to liquefy and the ham pieces and fragments separate and fall apart, thus presenting an unappetizing appearance.

Unexpectedly, I have discovered a method of preparing easily sliceable compact coherent masses of cooked poultry in which gluten is employed as a binder for the compact mass whereby the above problems are completely eliminated.

By employment of gluten as a binder, variations in the appearance of cooked fowl or poultry products are now possible, the cooked products made more pleasing to the eye, the adhesive properties of the binder are stable for periods of time sufficient to serve the purposes for which intended and the slicing properties of the cooked products enhanced.

Therefore, it is among the objects of the present invention to provide an edible adhesive for bonding poultry pieces or fragments in a coherent cooked mass thereby rendering the mass readily sliceable without shredding.

Another object of this invention is to provide a glutinous material for bonding poultry pieces or fragments in a coherent cooked mass.

Still another object of this invention is to provide a mass of poultry pieces and fragments bonded by gluten when cooked.

A further object of this invention is in the provision of a method of preparing poultry products which may be sliced after cooking without shredding.

A still further object of this invention resides in the provision of a method of preparing poultry products from pieces or fragments thereof which may be readily sliced after cooking.

Still another object of the present invention is to provide a method of preparing a compact coherent mass of poultry pieces and fragments which may be sliced after cooking.

Another object of this invention is to provide a method of bonding poultry pieces and fragments into a compact coherent mass which is readily sliceable after cooking.

Still another object of the invention is to provide a method of preparing a cooked compact coherent mass of poultry pieces and fragments using gluten or a glutinous material as the binder.

Another object of this invention is to provide an adhesive for poultry pieces and fragments comprising gluten or a glutinous material and the natural juices of the poultry.

Other and further objects and features of the present invention will become apparent upon a careful consideration of the following detailed description, when taken in conjunction with the accompanying drawing illustrating preferred embodiments of my invention, wherein like reference characters refer to like or corresponding parts throughout the several views.

As shown on the drawings:

FIGURES 1 through 11, inclusive, are each perspective views illustrating a preferred sequence of steps in the method of my invention and alternatives thereof;

FIGURE 12 is a perspective view showing the step of wrapping the product in a container preparatory to the cooking cycle;

FIGURE 13 is a side view in elevation showing the cooking cycle;

FIGURE 14 is a side view in elevation illustrating the cooling cycle:

FIGURE 15 is a perspective view illustrating the step of slicing the cooked product of one embodiment of my invention;

FIGURE 16 is a perspective view illustrating the prepared product enclosed in a transparent wrapper;

FIGURE 17 is a perspective view illustrating another embodiment of the cooked product of my invention;

FIGURE 18 is a perspective view illustrating a platter display of the product of FIGURE 17; and FIGURE 19 is a perspective view illustrating a further modification of the cooked product of my invention.

In the present invention the sequence of steps of my copending application are closely paralleled, and deviations and modifications therefrom will be indicated as the description of the present invention now proceeds.

As in my copending application, the particular poultry product illustrated in the drawing is a turkey of an approximate weight in excess of 20 pounds.

The preliminary steps of cleaning the turkey, being completely conventional, are again not illustrated, since such plucked and eviscerated turkeys are available on the commercial open market.

While certain of the following steps are mutually interchangeable, the first step of the improved method according to the present invention, as shown in FIGURE 1, may be that of removing the wing portions from the carcass of the uncooked turkey. This may be accomplished by using the conventional boning knife, and the wings must be carefully removed in order not to damage the surrounding layer of meat as is indicated by the area denoted by numeral 20.

The skin closing the neck is severed longitudinally along the upper surface 21 thereof and the neck then removed, whereby the neck flap 22 remains.

Thereafter the skin is cut along the leg areas designated generally with the numeral 23 in FIGURE 2, and is stripped over each leg to provide leg laps 24 and 25 shown in FIGURE 3.

The carcass is then cracked transversely across the back preferably, generally at the location designated with the numeral 26 in FIGURE 3, whereupon the leg section 27 is joined with the breast section 28 only by the skin extending along the back. The arrows in FIGURE 4 show the directions of relative movement between the legs and the breast sections 27 and 28 to effect the separation therebetween.

The leg extremities 27 are readily removed from the skin extending along the back of the carcass, and may be discarded, sold separately or used as hereinafter explained, as desired. The bones of the cavity 29 are loosened from the breast meat and completely removed from the breast meat (FIGURE 5).

The remaining mass of meat comprises substantially all white meat since it is the breast of the turkey.

At this stage in the preferred sequence, the poultry product has the general configuration shown in FIGURE 6, and comprises the body of meat 30 having the neck flap 22 extending from one end thereof and a rear flap extending from the other end thereof which is integral with the leg flaps 24 and 25. Alternately the meat may have been completely but carefully removed from the skin and the meat thereafter placed in the skin in a relationship corresponding to that above described.

In this state, the meat is completely boneless and is ready for the subsequent step of application of the gluten binder to the surfaces thereof.

Gluten indicated by numeral 19 preferably in a powdered form, is sprinkled from a sprinkling can or jar on the surfaces of the meat 30 and skin portion.

The gluten used may be any of a number of well known commercially available wheat flour glutens and, as an example of the type of wheat gluten found usable, I prefer the wheat gluten product sold by General Mills Corporation under the name of "Pro-80." "Pro-80" is a creamy tan colored powder produced by drying freshly washed gluten in a vacuum over at low temperatures. "Pro-80" is made from wheat flour and has a moisture content of from 6%–9%, a granulation over a 60 mesh of 1% maximum and through a 200 mesh of 25% to 75%. The apparent density of "Pro-80" loosely packed is 33 pounds per cubic foot and packed is 41 pounds per cubic foot. Upon moistening the gluten adhesive properties bind the meat firmly.

The gluten is preferably applied in dry powdered form and may be sprinkled on the fowl; however, a solution comprising gluten in a suitable edible medium may be supplied to the meat in any suitable manner as, for example, by being sprayed, coated or brushed on the pieces of meat as desired. One disadvantage found in the use of a gluten solution in applying the gluten to the meat is the possibility that the gluten solution will flow into cavities in the meat and form pockets thereof which are visibly apparent in the cooked fowl and would detract from the appearance thereof. I obtain good results by using from approximately two to three ounces of gluten for each turkey cooked.

It is also desirable to remove substantially all of the fatty tissue from the meat, such as may be present along the inner end portion of the neck 22 and portions of the back flap 31.

Further, the leg flaps include thick skin membranous portions, and it is preferable to remove such portions which are identified by the numerals 32 and 33 in FIGURE 6.

Next, the gluten sprinkled meat is rolled into a compact body of generally cylindrical configuration as shown in FIGURE 7, so that two sprinkled portions meet generally along the lines 34.

In the embodiment shown in FIGURE 7, the flaps 25 and 24 may then be drawn over the meat body and such flaps overlap each other as is shown in FIGURE 8. Preferably the flaps are secured together as indicated along the lines 35 and 36 which extend longitudinally thereof.

Thereafter the neck flap 22 and tail flap 31 as shown in FIGURE 9 are drawn over the ends of the meat body 30, and are secured to the flaps 24 and 25 along the respective lines 37 and 38 as shown in FIGURE 10. At this time, the entire meat body is ensheathed in the skin casing which maintains the shape and form thereof. The various flaps are drawn snugly over the meat body and they are secured in position by ordinary or conventional stitching.

However, care must be exercised so as not to tear the skin during the sewing operations for it is desirable that the skin remains intact because its shrinking properties are to be utilized in compressing the meat body during the cooking cycle.

It will be appreciated that if the skin is ripped or torn along the stitch lines, it will tear to a greater extent as it shrinks during the cooking cycle whereby the compressive force thereof to be exerted on the meat body will be proportionately decreased. In this connection it must be emphasized that considerable care should also be taken as the uncooked poultry product is being deboned, so as to leave the meat intact. Furthermore, scrap particles, crumbs and so forth may be sprinkled with gluten and added to the meat mass thereby minimizing waste. Consequently, if the usable meat is to be maximized, careful cutting about the bones is required. The steps so far described may be performed at room temperature, if desired, but ordinarily the uncooked poultry product will be taken directly from the freezer.

In some instances, it may be found desirable to shape the skin and ensheath the meat body prior to the cooking thereof, and, in such an event, may be accomplished by drawing cords thereabout as shown in FIGURE 11 or placed in a heat resistant casing. Such cords are designated in FIGURES 11 and 12 with the numerals 39 through 42.

In preparing for cooking the product, it may be enclosed in a suitable wrapper 43, such as an aluminum foil, and any spices or seasoning desired may be applied directly to the product before it is completely enclosed in the wrapper.

Next the wrapped product is placed in an oven and cooked for approximately three hours at a temperature of about 375° F. Any conventional oven or cooker may be employed to elevate the temperature of the product, such an exemplary device being indicated in FIGURE 13 by the numeral 14.

During the cooking of the skin ensheathed meat body, the natural juices of the skin will run into the cavities and boundaries thereof and between the white and dark meat and act as a carrier for the gluten which under the influence of the cooking temperature and compression of the meat and skin will bind the pieces of meat.

At these elevated temperatures the meat shrinks and the skin shrinks correspondingly, its form and shape being determined by the form and shape of the shrinking meat. The skin thus compresses the meat body into an integral mass during the cooking cycle and serves as a mold or form for confining and constraining the meat body therewithin. The natural juices of the poultry are thus retained on the product.

There is no meat waste during the entire cooking cycle since it is substantially solid throughout, and since it may be cut in whole slices it is convenient to handle and serve.

Following the cooking cycle, the product is cooled, preferably for about twelve hours, and the cooling may be preferred either at room temperature or within a refrigerator at the normal temperature thereof which usually will be about 20° F. Refrigerated cooling is preferable and in FIGURE 14 such a step is exemplified by the evaporator coils 45.

Following cooling of the cooked product, the aluminum foil wrapper 43 is removed, the twine or cords 39 through 42 are released or, if the meat mass had been placed in a heat resistant casing, the meat and casing removed from the oven for bulk sale in this state. The natural juices developed during the cooking cycle will be found to have solidified within the foil wrapper 43 and may be removed therefrom.

The product is now ready for use and may be sliced as shown in FIGURE 15, wherein one such slice is identified with the numeral 46.

It is found that the cooked product thus bonded by gluten has been integrated into a compact coherent mass, and there is no noticeable indication of the presence of the gluten substance in the cooked product. As a result, whole slices 46 are severable from the meat body without any noticeable crumbling. Furthermore, the slices may be of any desired thickness and may be cut on a regular butcher's slicer.

The slices thus cut are pleasing to the eye and due to the binding properties of the gluten, many variations of meat patterns may be obtained, depending upon the particular motif desired.

For example, if it is desired to produce a cooked product comprising white meat and dark meat variations, the above described process may be followed.

In this modification, after the uncooked poultry product is rendered completely boneless, dark meat 51 may be placed either along the sides of the breast meat 30 as shown in FIGURE 7a or may be placed in what previously constituted generally the breast cavity of the uncooked poultry product as appears in FIGURE 7b. Alternatively, dark meat 51 may be placed both along the sides of the breast meat 31 and in such breast cavity, and a cooked product, as appear in FIGURE 19 is obtained which is pleasing to the eye.

Gluten, preferably in powdered form, is sprinkled on the skin, white and dark meat, as desired, and on the surfaces thereof to be bonded together. Alternately the meats may be sprinkled separately and the two types of meat brought in contact.

The dark meat may be obtained from the extremities of the bird forming the rolled product, as desired. Thus, use of the meat of a particular bird may be maximized. In this case the gluten is sprinkled on the meat, the meat rolled, cooked, all in accordance with the above described process, and when removed from the wrapper the cooked product appears as an integral piece without any noticeable indication of the gluten binder. The product thus may also be sliced without any noticeable crumbling of the cooked product.

As appears in FIGURE 18, a pleasing display may be achieved by first slicing the cooked product of FIGURE 17 wherein dark meat was placed in the breast cavity into two pieces longitudinally and then slicing both pieces thus obtained into a plurality of slices of various thicknesses and placing the slices on a platter 61. The dark meat appears as a half-moon section surrounded by an integral white meat mass.

The cooked product, wherein dark meat was placed both in the cavity and along the outer surface of the breast meat, is illustrated in FIGURE 19.

It will therefore be appreciated that the meat body during the cooking thereof has been compressed into a unitary or integral mass by the skin which incrementally shrinks more tightly thereabout as the heating cycle continues.

As an alternative to selling the cooked product in a sliced form, it may be sold in bulk state. In such event, the cooked mass is preferably encased in a transparent wrapper sealed thereabout. Any of the conventional and well known wrappers may be employed as, for example, Saran. Wrappers of this type can be made to conform to the shape of the product and are skin-like in their tightness. Such a wrapper is shown in FIGURE 16 and is designated by numeral 47. Before wrapper 47 is sealed, I prefer to enclose a portion of the congealed juices of the poultry so that they may be available to the user for flavoring, gravies, etc.

The cooked product may comprise about six to eight pounds of solid white meat, assuming a turkey having an initial weight of 20 to 24 pounds, and with respect to the embodiments shown in FIGURES 7a, 17 and 19, it will be appreciated that the weight of the cooked product will be proportionately increased depending upon the amount of meat added thereto.

It will be appreciated from the foregoing that no wastage in the entire cooked product is involved, since it is substantially solidly bonded throughout; and because it may be cut into whole slices, it is convenient to handle and serve.

Furthermore, use of gluten as a binder is not limited to poultry and may be employed to bind any variety or kind of meat.

Thus by employment of gluten as a binder I provide cooked poultry products of a variety of meats which are pleasing to the eye, integral in appearance, and easily sliceable after cooking without shredding.

While preferred embodiments of the invention have been shown and described, various other modifications and substitutions of equivalents will occur to those skilled in the art after a study of the foregoing disclosure. Hence, the disclosure should be taken in an illustrative, rather than a limiting sense, and it is the desire and intention to reserve all modifications within the scope of the subjoined claims.

I claim as my invention:

1. The process of preparing a boneless cooked poultry product which will slice without shredding comprising: separating from the carcass of an uncooked poultry product the meat and the coextensive and adjacent skin portions thereof, adding gluten to the resulting mass, forming the meat into a compact mass whereby certain of the free surface areas thereof are necessarily brought into contiguous relation, securing said skin portions in covering relation about said compact mass, elevating the temperature of the thusly formed compact product to cook the same and cause juices from the underlying skin portion to flow into said meat product and moisten the gluten for bonding the meat mass while at the same time the shrinking skin thereabout compresses the meat mass into a unified integrated body.

2. The process of preparing a boneless cooked poultry product which will slice without shredding comprising: separating from the carcass of an uncooked poultry product the meat and the coextensive and adjacent skin portions thereof, adding powdered gluten to the resulting mass, forming the meat into a compact mass whereby certain of the free surface areas thereof are necessarily brought into contiguous relation, securing said skin portions in covering relation about said compact mass, elevating the temperature of the thusly formed compact product to cook the same and cause juices from the underlying skin portion to flow into said meat product and moisten the gluten for bonding the meat mass while at the same time the shrinking skin thereabout compresses the meat mass into a unified integrated body.

3. The process of preparing a boneless cooked turkey which will slice without shredding comprising: separating from the carcass of an uncooked turkey the meat and the coextensive and adjacent skin portions thereof, adding gluten to the resulting mass, forming the meat into a compact mass whereby certain of the free surface areas thereof are necessarily brought into contiguous relation, securing said skin portions in covering relation about said compact mass, elevating the temperature of the thusly formed compact product to cook the same and cause juices from the underlying skin portion to flow into said meat product and moisten the gluten for bonding the meat mass while at the same time the shrinking skin thereabout compresses the meat mass into a unified integrated body.

4. The process of preparing a boneless cooked poultry product which will slice without shredding comprising: separating from the carcass of an uncooked poultry product the white meat and the coextensive and adjacent skin portions thereof adding gluten to the resulting mass forming the meat into a compact mass whereby certain of the free surface areas thereof are necessarily brought into contiguous relation securing the skin portions in covering relation about said compact mass, elevating the temperature of the thusly formed compact product to cook the same and cause the juices from the underlying skin portions to flow into the meat and moisten the gluten for binding the meat mass while at the same time the shrinking skin thereabout compresses the meat mass into a unified integrated body.

5. In the process of preparing a boneless cooked poultry product which will slice without shredding, the steps comprising: separating from the carcass of an uncooked poultry product the breast meat and the coextensive and adjacent skin portions thereof, adding gluten to the breast meat, placing at least one piece of dark meat in contiguous relation with the breast meat, forming the breast meat and dark meat into a compact mass whereby certain of the free surface areas of the breast meat are necessarily brought in contiguous relation, securing said skin portions in covering relation about said compact mass, elevating the temperature of the thusly formed skin encased product to cook the same and cause juices from the underlying skin portions to flow into said meat product and moisten the gluten for bonding the meat mass while at the same time the shrinking skin thereabout compresses the meat mass into a unified integrated body.

6. In the process of preparing a boneless cooked poultry product which will slice without shredding, the steps comprising: separating from the carcass of an uncooked poultry product the breast meat and the coextensive and adjacent skin portions thereof, adding gluten to both breast meat and dark meat, placing at least one piece of dark meat in contiguous relation with the breast meat, forming the breast meat and dark meat into a compact mass whereby certain of the free surface areas of the breast meat are necessarily brought in contiguous relation, securing said skin portions in covering relation about said compact mass, elevating the temperature of the thusly formed skin encased product to cook the same and cause juices from the underlying skin portions to flow into said meat product and moisten the gluten for bonding the meat mass while at the same time the shrinking skin thereabout compresses the meat mass into a unified integrated body.

7. In the process of preparing a boneless cooked poultry product which will slice without shredding, the steps of separating from the carcass of an uncooked poultry product the breast meat and the coextensive and adjacent skin portions thereof, adding gluten to the breast meat, placing at least one piece of dark meat in the cavity from which the backbone and chest bones are removed, forming the breast meat into a compact mass about said dark meat whereby certain of the free surface areas of the breast meat are necessarily brought into contiguous relation, securing the skin portions in covering relation about said compact mass, elevating the temperature of the thusly formed skin encased product to cook the same and cause juices from the underlying skin portions to flow into said meat product and moisten the gluten for bonding the meat mass while at the same time the shrinking skin thereabout compresses the meat mass into a unified integrated body.

8. In the process of preparing a boneless cooked poultry product which will slice without shredding, the steps comprising: separating from the carcass of an uncooked poultry product the breast meat and the coextensive and adjacent skin portions thereof, adding gluten to the breast meat, placing at least one piece of dark meat in contiguous relation with the outer surface of the breast meat, forming the breast meat and dark meat into a compact mass whereby certain of the free surface areas of the breast meat are necessarily brought into contiguous relation, securing the skin portions in covering relation about said compact mass, elevating the temperature of the thusly formed skin encased product to cook the same and cause juices from the underlying skin portions to flow into said meat product and moisten the gluten for bonding the meat mass while at the same time the shrinking skin thereabout compresses the meat mass into a unified integrated body.

9. The process of preparing a boneless cooked poultry product which will slice without shredding comprising the steps of separating from the carcass of an uncooked poultry product the breast meat and the coextensive and adjacent skin portions thereof, adding gluten to the breast meat, placing at least one piece of dark meat in the cavity from which the backbone and chest bones are removed and at least one piece of dark meat in contiguous relation with the outer surfaces of the breast meat, forming the breast meat and dark meat into a compact mass whereby certain of the free surface areas of the breast meat are necessarily brought into contiguous relation, securing the skin portions in covering relation about said compact mass, elevating the temperature of the thusly formed rolled product to cook the same and cause juices from the underlying skin portions to flow into said meat product and moisten the gluten for bonding the meat mass while at the same time the shrinking skin thereabout compresses the meat mass into a unified integrated body.

10. A poultry bonding agent comprising gluten and the juices of the poultry.

References Cited in the file of this patent

UNITED STATES PATENTS

| | | |
|---|---|---|
| 1,427,438 | Brickman | Aug. 29, 1922 |
| 2,571,544 | Cutrera | Oct. 16, 1951 |
| 2,633,601 | Snyder | Apr. 7, 1953 |
| 2,640,779 | George | June 2, 1953 |
| 2,808,335 | Pierce | Oct. 1, 1957 |
| 2,844,844 | Sieczkiewicz | July 29, 1958 |
| 2,922,718 | Saverslak | Jan. 26, 1960 |

OTHER REFERENCES

"The Condensed Chemical Dictionary," Fifth Edition, 1956, by A. Rose, et al., published by Reinhold Publishing Corp., New York, page 526, article entitled Gluten.